United States Patent [19]

Kawamura et al.

[11] Patent Number: 5,320,315
[45] Date of Patent: Jun. 14, 1994

[54] MICROSCOPE SUPPORTING MECHANISM

[75] Inventors: Takatoshi Kawamura; Takashi Takeuchi, both of Tokyo, Japan

[73] Assignee: Kabushiki Kaisha Shinkawa, Tokyo, Japan

[21] Appl. No.: 842,251

[22] Filed: Feb. 27, 1992

[30] Foreign Application Priority Data

Feb. 27, 1991 [JP] Japan .................................. 3-053702

[51] Int. Cl.⁵ ............................................ H01L 21/60
[52] U.S. Cl. .................................. 248/282; 248/289.1; 248/299; 359/384
[58] Field of Search ............... 248/282, 289.1, 299; 359/384

[56] References Cited

U.S. PATENT DOCUMENTS

| 251,721 | 1/1882 | Lomb et al. | 359/384 |
| 2,556,026 | 6/1951 | Carlisle | 248/289.1 |

FOREIGN PATENT DOCUMENTS 2-58775  12/1990  Japan ........................... H01L 21/60

Primary Examiner—Eugenia Jones
Assistant Examiner—Allan M. Schrock
Attorney, Agent, or Firm—Koda and Androlia

[57] ABSTRACT

A microscope mount for mounting a microscope, which is used for observation of bonding conditions, etc., to a bonding machine including a supporting shaft, a microscope attachment shaft and a pair of swing plates rotatably connected to the supporting shaft at one end and to the microscope attachment shaft at the other end. Pulleys are fixed on the shafts, and a belt is installed between the pulleys. A microscope is mounted on the microscope attachment shaft, and the mount is attached to the bonding machine. When in this state the mount is rotated about the supporting shaft, the facing direction of the microscope on the attachment shaft can be kept the same.

3 Claims, 3 Drawing Sheets

MICROSCOPE SUPPORTING MECHANISM

BACKGROUND OF THE INVENTION

1. Field of the Invention

The present invention relates to a supporting mechanism for microscopes which examine the surfaces of finished areas such as bonded parts of, for example, a semiconductor device.

2. Prior Art

In bonding machines, microscopes are used to check the bonding conditions of semiconductor devices, etc. Usually, the microscope is mounted to the bonding machine via a microscope supporting mechanism that is attached to a fixed or immovable part of the bonding machine.

One example of a microscope supporting mechanism is described in the Japanese Patent Application Publication ("Kokoku") No. 2-58775. In this prior art, the microscope is moved by hand in the directions parallel and vertical relative to the direction the semiconductor devices are fed out.

In the microscope supporting mechanism of this prior art, however, it is sometimes necessary to set the microscope aside from the area where the bonding is performed. Such a movement of the microscope is necessary because it can be a hindrance when the semiconductor devices are examined visually and when parts of the bonding machine near the bonding area are adjusted. In view of such a necessity, in the above-described prior art, the entire microscope supporting mechanism is arranged so as to be rotated about a supporting shaft. However, since the microscope supporting mechanism is simply rotated about the supporting shaft when the microscope is moved from the bonding area, the microscope itself is also rotated by the same angle of the rotation the supporting mechanism makes. This results in that the posture of the microscope or the direction the microscope faces is changed.

Meanwhile, in order to secure a wide space near the bonding area, it is necessary to rotate the supporting mechanism approximately 90 degrees. However, if the parts of the bonding machine are near the microscope supporting mechanism, the microscope touches those parts when it is rotated. Thus, the rotation of the microscope supporting mechanism is limited. For this reason, it is necessary to loosen a knob and then rotate the microscope supporting mechanism while adjusting the posture of the microscope. Therefore, the microscope cannot be quickly moved away from the bonding area where the bonding and observation of bonding conditions are performed.

SUMMARY OF THE INVENTION

Accordingly, the object of the present invention is to provide a microscope supporting mechanism which moves the microscope away quickly from its position near the bonding or observation area.

The object of the present invention is accomplished by a unique structure for a microscope supporting mechanism which includes: a supporting shaft, swing plates respectively supported at one end to the supporting shaft in a rotatable manner about the supporting shaft, a first pulley fixed to the supporting shaft, a microscope attachment shaft rotatably mounted to the other ends of the swing plates, a second pulley fixed to the microscope attachment shaft, and a belt installed between the two pulleys. A microscope is mounted to the microscope attachment shaft.

Because of this structure, even when the swing plates are rotated about the supporting shaft, the first pulley on the supporting shaft does not rotate. As a result, when the swing plates are rotated, the microscope attachment shaft, which has the second pulley on it, can rotate relative to the swing plates by an angle equal to the angle of rotation of the swing plates, since the belt is linked to the swing plates at a rotational speed ratio of 1:1. As a result, the posture of the microscope can remain the same in spite of the rotation of the swing plates.

Since there is no change in the direction the microscope faces, the microscope does not come in contact with any parts of the bonding machine. In other words, the microscope can be quickly moved away from the observation area merely by rotating the swing plates.

BRIEF DESCRIPTION OF THE INVENTION

FIG. 1 is a perspective view showing one embodiment of the microscope supporting mechanism according to the present invention;
FIG. 2 is a front view thereof;
FIG. 3 is a top view thereof; and
FIG. 4 is a right side view thereof.

DETAILED DESCRIPTION OF THE INVENTION

Figure 1:
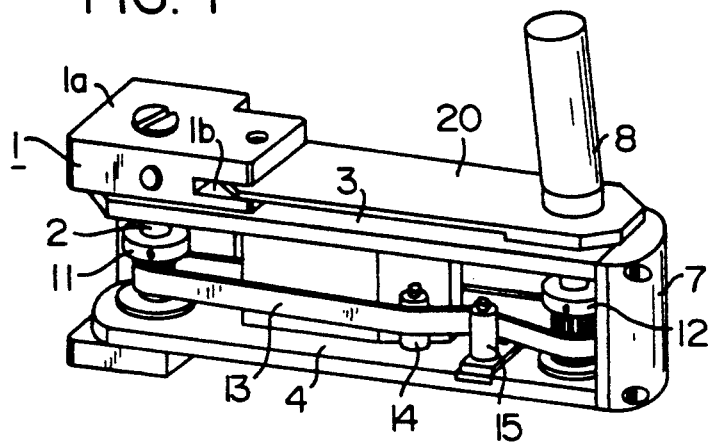
Figure 2:
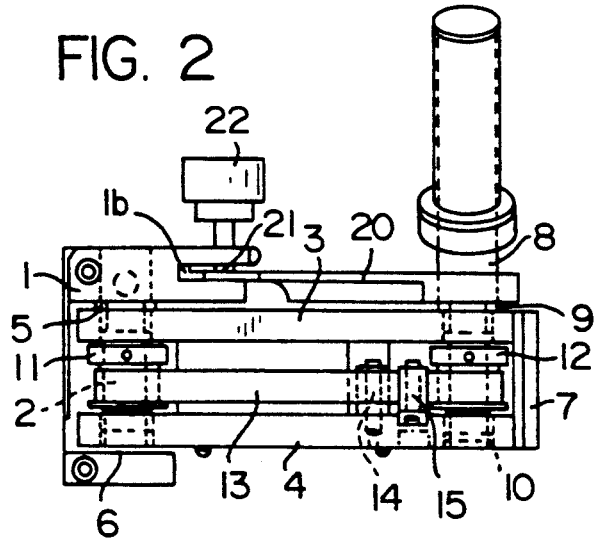

One embodiment of the present invention will be described below with reference to the accompanying drawings.

A supporting shaft 2 is fixed to a U-shaped frame 1. Two swing plates 3 and 4 are installed one above the other inside the frame 1. These plates are mounted, each at one end, to the supporting shaft 2 via flanged sleeve bearings 5 and 6 so that the plates 3 and 4 are rotatable. The other ends of the swing plates 3 and 4 are fixed to a fastening plate 7 as an integral single unit.

A microscope attachment shaft 8 is mounted on the other ends of the swing plates 3 and 4 via flanged sleeve bearings 9 and 10 in such a manner that the shaft 8 is rotatable.

First and second timing pulleys 11 and 12 are respectively mounted to the supporting shaft 2 and the microscope attachment shaft 8. These pulleys are between the swing plates 3 and 4.

A timing belt 13 is installed between the two pulleys 11 and 12. In order to apply tension to the timing belt 13, freely rotatable tension rollers 14 and 15 are provided on the swing plate 4. The rollers 14 and 15 press against the timing belt 13 for providing adequate tension to the belt 13. The timing belt 13 is linked to the swing plates 3 and 4 at a speed ratio of 1:1.

A locking plate 20 is attached to the microscope attachment shaft 8 at one end. The other end of the locking plate 20 is inserted into a groove 1b of the U-shaped block 1a of the frame 1. A contact plate 21 is provided in the frame 1 so that the plate 21 is over the upper surface of the locking plate 20. A locking screw 22 is mounted to the frame 1 at a position that corresponds to the contact plate 21. When the locking screw 22 is tightened, the contact plate 21 is pressed against the locking plate 20, thus positionally fixing the locking plate 20, and therefore, the microscope attachment shaft 8, too. When the locking screw 22 is loosened, the pressing force of the contact plate 21 against the locking plate 20 is released, and the locking plate 20 and the microscope attachment shaft 8 become movable or freely tuned.

Figure 4:
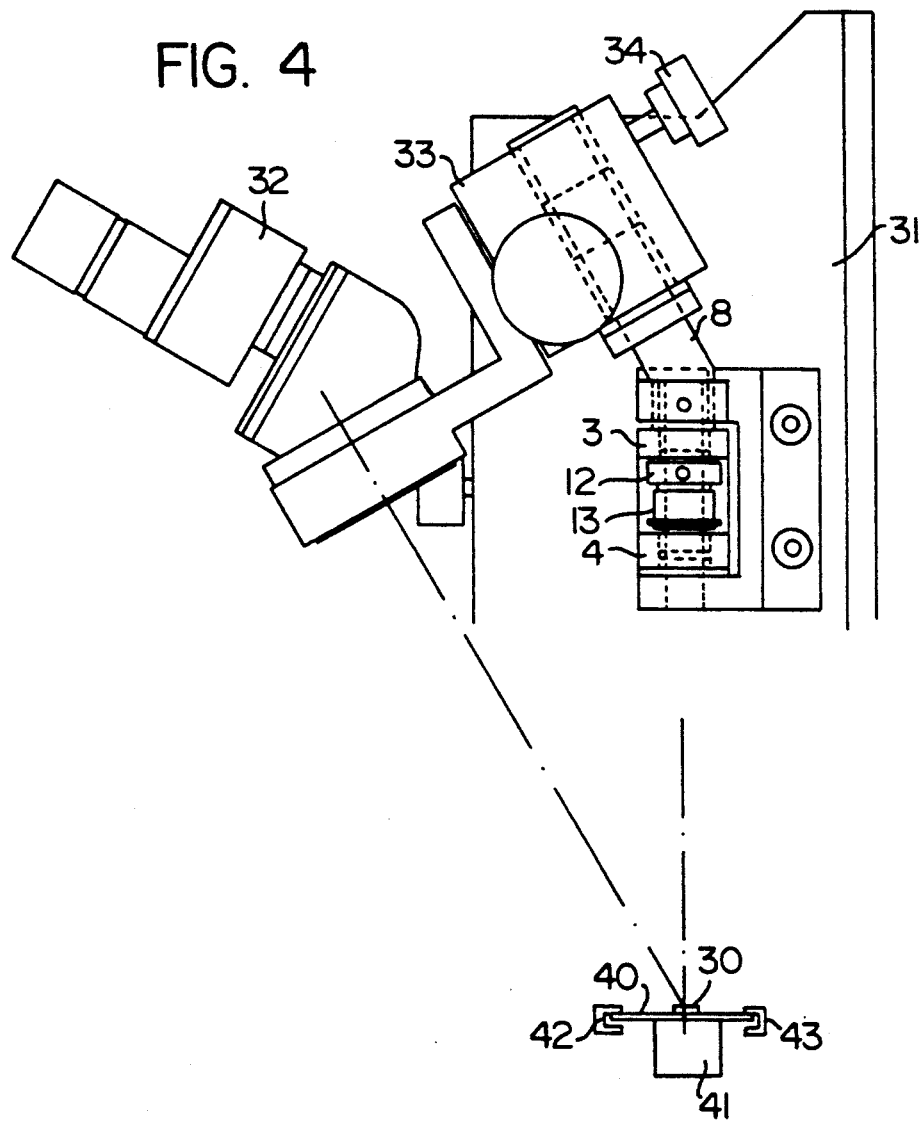

As seen in FIG. 4, the microscope supporting mechanism is mounted to a fixed or immovable part 31 of a bonding machine. The mounting position is usually near the bonding area 30 of the bonding machine, and the microscope holder 33 of a microscope 32 is mounted to the microscope attachment shaft 8 by means of a knob 34.

In FIG. 4, a heater block 41, which is in contact with the lead frame 40 so as to heat it, is installed in the bonding area 30. The heater block 41 is movable up and down. Guide rails 42 and 43 are for guiding the lead frame 40 intermittently. A retaining plate (not shown) which presses the lead frame 40 against the heater block 41 is installed above the bonding area 30 such that the retaining plate is moved vertically.

The operation of the above-described embodiment will be described below.

Figure 3:
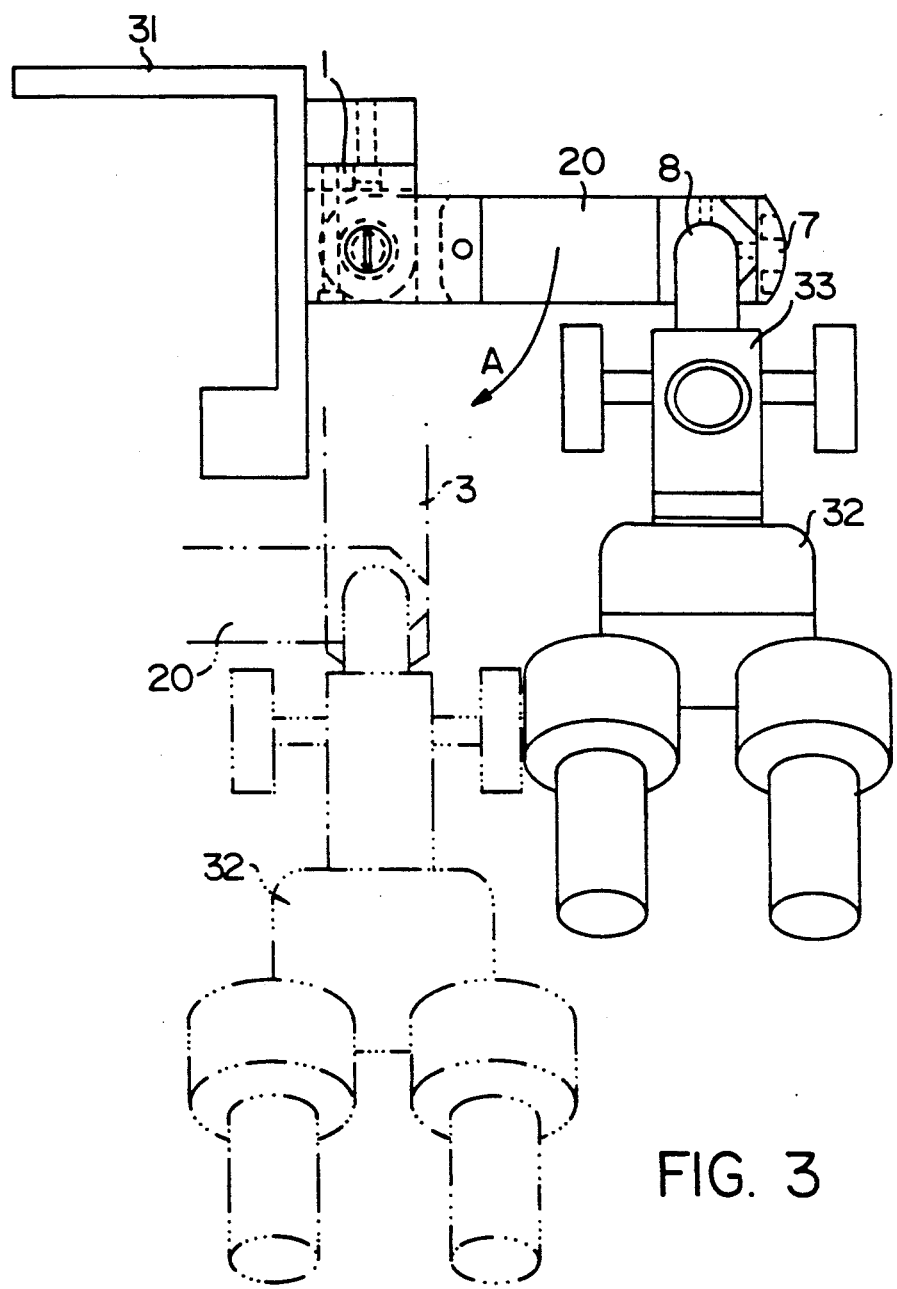

FIGS. 3 and 4 show positions of the microscope mounted on the bonding machine.

The microscope 32 is positioned above and in the front of the bonding area 30. The microscope 32 is moved away from the bonding area 30 by loosening the locking screw 22 and rotating the microscope 32 or one of the swing plates 3 and 4 in the direction shown by the arrow A about the supporting shaft 2.

In this case, since the first timing pulley 11 is fixed to the supporting shaft 2 and the supporting shaft 2 is mounted to the frame 1, the first timing pulley 11 does not rotate even when the swing plates 3 and 4 are rotated. Accordingly, when the swing plates 3 and 4 are thus rotated, the timing pulley 12 and microscope attachment shaft 8 rotate relative to the swing plates 3 and 4 by an angle that corresponds to the angle of rotation of the swing plates 3 and 4, since the timing belt 13 is linked to the swing plates 3 and 4 at a speed ratio of 1:1.

As a result, the posture of the timing pulley 12, or the direction the pulley 12 faces, remains the same when the swing plates 3 and 4 are rotated. In other words, since the microscope attachment shaft 8 is mounted to the timing pulley 12, and the microscope 32 is attached to the microscope attachment shaft 8, the posture of the microscope 32 (or the direction the microscope 32 faces) remains the same as shown by the two-dot line in FIG. 3 when the microscope 32 is moved away from the bonding or observation area 30.

As seen from the above, since the facing direction or the posture of the microscope 32 remains the same, it does not come into contact with any part of the bonding machine. Also, since it is only necessary to rotate the swing plates 3 and 4 in order to move the microscope 32 away, the microscope 32 can be moved very quickly.

In the embodiment described above, the timing belt 13 is used; however, it is possible to use a chain or an ordinary belt instead. Use of a timing belt 13 is of course more desirable.

We claim:

1. A microscope supporting mechanism in a semiconductor processing machine comprising:
    a supporting shaft;
    swing plates having two ends, each plate being mounted rotatably at one of said two ends to said supporting shaft;
    a first pulley fixed to said supporting shaft;
    a microscope attachment shaft rotatably mounted on the other end of said swing plates, a microscope being attached to said microscope attachment shaft;
    a second pulley mounted on said microscope attachment shaft; and
    a belt provided between said first and second pulleys;
    whereby said microscope is easily moved by rotating said swing plates and an orientation of said microscope is not changed when said swing plates are rotated.

2. A microscope supporting mechanism in a semiconductor processing machine comprising:
    a U-shaped frame;
    a supporting shaft fixed to said frame;
    a microscope attachment shaft to which a microscope is attached;
    a pair of swing plates having two ends provided with a space in between, each plate being rotatably mounted at one of said two ends to said supporting shaft and mounted to said microscope attachment shaft at the other end;
    a first pulley fixed to said supporting shaft;
    a second pulley fixed to said microscope attachment shaft; and
    a belt provided between said first and second pulleys;
    whereby said microscope is easily moved by rotating said swing plates and an orientation of said microscope is not changed when said swing plates are rotated.

3. A microscope supporting mechanism according to claim 2, further comprising a locking plate having two ends provided above one of said swing plates, one of said two ends of said locking plate being attached to said microscope mounting shaft and the other end being inserted in a groove formed in a mounting block so that said other end of said locking plate is pressed to said mounting block by a screw, thus locking said microscope attachment shaft.

* * * * *